United States Patent

Peltonen et al.

[11] Patent Number: 5,890,147
[45] Date of Patent: Mar. 30, 1999

[54] SCOPE TESTING OF DOCUMENTS IN A SEARCH ENGINE USING DOCUMENT TO FOLDER MAPPING

[75] Inventors: Kyle G. Peltonen; Sitaram C. V. Raju, both of Issaquah; Bartosz B. Milewski, Seattle, all of Wash.

[73] Assignee: Microsoft Corporation, Redmond, Wash.

[21] Appl. No.: 813,618

[22] Filed: Mar. 7, 1997

[51] Int. Cl.$^6$ .................................................. G06F 17/30
[52] U.S. Cl. ........................... 707/1; 707/3; 707/100; 707/102; 707/200
[58] Field of Search ............................ 707/1, 2, 3, 4, 707/5, 6, 100, 200, 102

[56] References Cited

U.S. PATENT DOCUMENTS

| | | | |
|---|---|---|---|
| 5,202,986 | 4/1993 | Nickel | 395/600 |
| 5,319,762 | 6/1994 | Mayer | 395/425 |
| 5,333,317 | 7/1994 | Dann | 395/600 |
| 5,465,353 | 11/1995 | Hull et al. | 395/600 |
| 5,544,360 | 8/1996 | Lewak et al. | 395/600 |
| 5,692,173 | 11/1997 | Chew | 395/603 |
| 5,701,469 | 12/1997 | Brandli et al. | 395/613 |
| 5,729,730 | 3/1998 | Wlaschin et al. | 395/603 |

Primary Examiner—Paul V. Kulik
Assistant Examiner—Michael J. Wallace, Jr.
Attorney, Agent, or Firm—Albart S. Michalik, Esq.

[57] ABSTRACT

A method and mechanism for responding to a query in a hierarchically organized system of documents and folders. In response to the query, a set of documents is retrieved based on specified criteria. Only documents in that set which match a specified scope are returned in a result set. Scope testing is performed on each of the documents in the set by obtaining a document identifier of each document, and then using that document identifier to obtain a document identifier of the parent folder thereof. The document identifier of the parent folder is used as a key to a data structure, which stores flags indicative of whether parent folders are in the specified scope. If the flag for a given parent folder indicates that the parent folder is in scope, the document having that parent is returned in the result set. If the flag indicates that the current document is not in scope, that document is not returned. If there was not an entry in the data structure for that key, prefix matching is performed on the parent folder to determine whether it is in scope. The parent folder scope information is then added to the data structure as a flag indexed by the document identifier of the parent folder.

31 Claims, 14 Drawing Sheets

78

| DOCUMENT NAME | DOC ID |
|---|---|
| D:\FOLDER1\FOLDER3\DOC4 | 2 |
| D:\FOLDER1\FOLDER3\DOC5 | 10 |
| D:\FOLDER1\FOLDER11\MSOFFICE\SHEET4.XLS | 119 |
| D:\FOLDER1\FOLDER11\MSOFFICE\WORDPROC.DOC | 137 |
| D:\FOLDER1\FOLDER11\MSOFFICE\SHEET8.XLS | 159 |
| D:\FOLDER1\FOLDER2\FOLDER4\DOC1 | 4 |
| D:\FOLDER1\FOLDER7\MYDOCS\ABC.TXT | 145 |
| D:\FOLDER1\FOLDER8\DOCABC | 55 |
| D:\FOLDER1\FOLDER7\DOC27.DOC | 81 |
| ... | ... |
| D:\FOLDER1\FOLDER31\FOLDER27\FOLDER90\FOLDER18\DOC8 | 337 |
| D:\FOLDER1\FOLDER31\FOLDER27\FOLDER90\XYZ.XLS | 221 |
| D:\FOLDER1\FOLDER2\FOLDER4\DOC2 | 9 |
| D:\FOLDER1\FOLDER6\A.DBS | 300 |
| D:\FOLDER1\FOLDER5\A123.DOC | 67 |
| D:\FOLDER1\FOLDER8\UTX.XLS | 45 |
| D:\FOLDER1\FOLDER6\123.TXT | 57 |
| D:\FOLDER1\FOLDER6\KLM.TXT | 48 |
| D:\FOLDER1\FOLDER2\DOC3 | 6 |
| D:\FOLDER1\FOLDER7\SCHEDULE | 88 |
| D:\FOLDER1\FOLDER9\LOG.TXT | 94 |

FIG. 5

| 86 ⟶ | 8 | 1 |
|---|---|---|
| | 50 | 1 |
| | 3 | 0 |
| | 90 | 0 |
| | 5 | 1 |
| | 864 | 0 |
| | 193 | 0 |
| | 553 | 0 |
| | ⋮ | ⋮ |
| | 881 | 0 |
| | 239 | 0 |
| | 363 | 0 |
| | 193 | 0 |
| | 889 | 0 |
| | 765 | 0 |
| | 773 | 0 |

FIG. 8

| DOCUMENT NAME | SIZE | CREATION DATE |
|---|---|---|
| D:\FOLDER1\FOLDER2\FOLDER4\DOC1 | 21,594 | 04/16/94 |
| D:\FOLDER1\FOLDER2\FOLDER4\DOC2 | 453,197 | 07/09/95 |
| D:\FOLDER1\FOLDER2\DOC3 | 48,591 | 03/13/96 |

| 22 | 1 | 1 |
| --- | --- | --- |
| 4 | 1 | 0 |
| 19 | 1 | 0 |
| 6 | 0 | 0 |
| 3 | 0 | 0 |
| 1 | 0 | 0 |
| 0 | 0 | 0 |
| 8 | 1 | 0 |
| 27 | 0 | 0 |
| 26 | 0 | 0 |
| 25 | 0 | 0 |
| 24 | 0 | 0 |
| 23 | 0 | 0 |
| 21 | 0 | 0 |
| 31 | 0 | 0 |

FIG. 15

SCOPE TESTING OF DOCUMENTS IN A SEARCH ENGINE USING DOCUMENT TO FOLDER MAPPING

FIELD OF THE INVENTION

The invention relates generally to computer search engines, and more particularly to an improved method and mechanism for using a search engine to retrieve document information in response to a user query.

BACKGROUND OF THE INVENTION

Hierarchically organized data, such as in advanced computer file systems including Microsoft's Object File System (OFS) and Microsoft's Windows NT™ File System (NTFS), may be associated with a search engine (query engine). The search engine allows a user to query the data and/or the file system in order to locate documents (i.e., files or objects) that match the user's query specification. For example, the above file systems separately index the contents and the properties of documents stored thereby, so that even though the data in the documents is not structured like database data, the query engine can quickly respond to such queries. To respond to a query, the query engine accesses the index and returns information about the located documents in a result set. Other search engines work similarly with other hierarchically organized data.

The query specification includes a restriction, which is a set of criteria (content and/or properties) that matching documents will possess. A typical query specification also includes a scope, which is the set of folders or directories that are to be examined, and a return set, which identifies which properties are to be returned for each matching document that is returned in the result set. For example, a query may consist of a restriction specifying that matching documents will contain the text "computer software," the scope to examine will be c:\folder1, and the return set will supply the file name and file size of matching files. The scope can be specified as shallow, whereby only documents in the specified folder are returned, or deep, whereby matching documents in the specified folder and any sub-folders-thereof are returned.

The indexes are inverted text indexes, that is, organized and keyed by textual words, and not by any hierarchical relationship between folders and documents. Consequently, when a query is being processed, the search engine searches the index to obtain the documents that match the specified restriction without respect to scope. To scope test, the search engine performs a string comparison, known as prefix matching, on each of the documents as they are retrieved to determine which, if any, of those files are within the specified scope. Located files that have prefixes corresponding to those in the query specification are said to be "in scope." Properties of those matching files which are in scope are then returned in the result set.

However, string comparisons, and thus prefix matching, are relatively slow and costly processes. Prefix matching is further complicated by the use of both long and short filenames, uppercase and lowercase distinctions in filenames, and by the use of international Unicode file names where one string may have several unique but equivalent representations. In addition, for each located document, the full path of the document's folder is created in memory, in which the space is heap allocated because the path is of an arbitrary and unknown string size with no definite upper limit. Lastly, since more than one folder may be named in a specified scope set, and since the located documents are disjoint, prefix matching will have to be done, one document at a time, for each named folder until a match is found or the document is determined to be not in scope. This means that all specified folders in a given set are prefix matched for documents that are ultimately determined to be not in scope, and, on average, half of the specified folders will be tested for documents that are in scope before a match can be found.

In short, although the above-described query-resolving technique functions adequately when only a small number of files are involved, the prefix matching process consumes substantial resources when a relatively large number of documents are scope tested. At the same time, OFS, NTFS and other systems of hierarchically-organized data are designed to support large result sets containing hundreds of thousands of results. Since OFS and NTFS and the like are typically used in networked client-server environments, it is commonplace to have such large queries, making scope testing costly.

OBJECTS AND SUMMARY OF THE INVENTION

Accordingly, a general object of the invention is to provide a method and mechanism that substantially improves the querying of a search engine.

It is a related object to substantially improve the search engine querying process for queries dealing with large numbers of documents.

Another object is to provide a method and mechanism of the above kind in which the amount of time taken to resolve a query is substantially decreased.

A related object is to provide a method and mechanism as characterized above in which the amount of time taken to scope test criteria-matched documents is substantially decreased.

Yet another object is to provide such a method and mechanism that functions with existing search engines and hierarchically organized data and is extensible.

Briefly, the present invention provides a method and mechanism for responding to a query of hierarchically-organized structure of data, such as documents and folders in a file system, wherein as documents are retrieved based on specified criteria, those documents that match a specified scope are returned. To this end, each retrieved document is selected as a current document, and a document identifier is obtained therefor. An identifier of the parent folder of the current document is obtained. The ID of the parent folder may be determined from the ID of the document by accessing the document ID to parent ID mapping table present on certain file systems. Such a mapping table can also be generated by the search engine.

Once the parent identifier is obtained, it is used as a key to a data structure, such as a hash table, which includes a flag indexed by the key (ID of the parent folder). The flag maintains a value indicative of whether documents under that parent folder including the current document are in scope or not in scope. If the flag indicates that the current document is in scope, that document is returned in the result set, generally as a file name along with other properties thereof. If the flag indicates that the current document is not in scope, that document is not returned.

If there was not an entry in the data structure for the current document's parent folder, prefix matching or some alternative test is performed on the parent folder to determine whether it is in scope. The parent folder scope information is then added to the data structure as a flag indexed by the parent folder identifier, whereby subsequent retrieved documents sharing that same folder will not need to undergo prefix matching. The method and mechanism are repeated as each document is retrieved until the documents are scope tested in this manner.

Other objects and advantages will become apparent from the following detailed description when taken in conjunction with the drawings, in which:

BRIEF DESCRIPTION OF THE DRAWINGS

FIG. 5 is an exemplary list representative of files which match a specified restriction set forth in a query;

FIG. 7 is a diagram representing a mapping of hierarchical relationships between identifiers of the documents and folders in a file system or the like;

FIG. 8 is a block diagram representing an exemplary cache table constructed in accordance with the present invention to facilitate improved scope testing;

FIG. 12 is an exemplary list representative of file information which is returned in a result set;

FIG. 15 is a block diagram representing an alternative cache table constructed in accordance with the present invention to facilitate improved scope testing.

DETAILED DESCRIPTION OF THE PREFERRED EMBODIMENT

Figure 1:
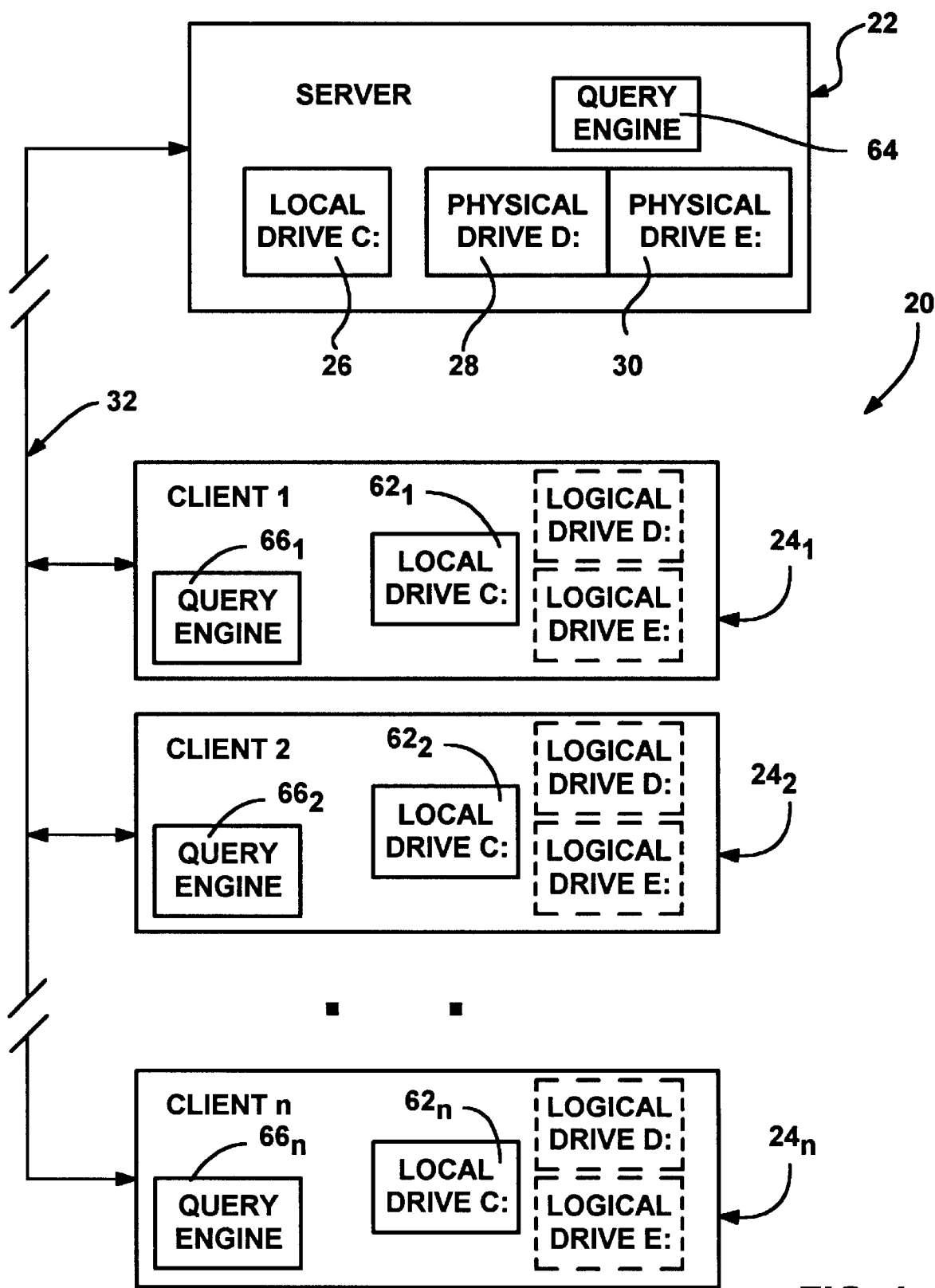
FIG. 1 is a block diagram representing a computer network in which the present invention may be incorporated.

Turning to the drawings and referring first to FIG. 1, there is shown a computer networking system generally designated 20 into which the present invention may be incorporated. The illustrated network comprises a server 22 and a number of computer-based resources (e.g., client workstations such as personal computers) $24_1$–$24_n$ connected thereto in a known manner. Of course, it can be appreciated that the invention is not limited to any particular networked environment, or even a network at all, but alternatively may be incorporated into a stand-alone personal computer or the like. Indeed, the server 22 is typically a relatively high-powered personal computer, and the invention may be present within the operating system, search engine and/or file system of the server 22 independent of any clients. Thus, the server 22 exemplified herein has its own local C: drive 26, as well as physically having or being closely connected to client-accessible drives such as a D: drive 28 and an E: drive 30.

The computer-based resources $24_1$–$24_n$ are interconnected in a networked fashion on an interconnection mechanism 32, which may be a local area network, wide area network or other interconnection mechanism. The interconnection mechanism 32 allows the resources $24_1$–$24_n$ to logically have access to drives D: and E: (28, 30) of the server 22. Physically, the interconnection mechanism 32 may include any well known data transmission medium, for example, coaxial cable, telephone cable, fiber optic cable, and the like, in accordance with a chosen standard for hardware interfaces within each of the devices. Such standards, including ARCnet®, Ethernet® and Token Ring®, and their associated hardware interfaces are well known in the art, and are not described in detail herein. Suffice it to say that many commercially available interface boards may be used to connect computer-based resources in a networked fashion.

Figure 2:
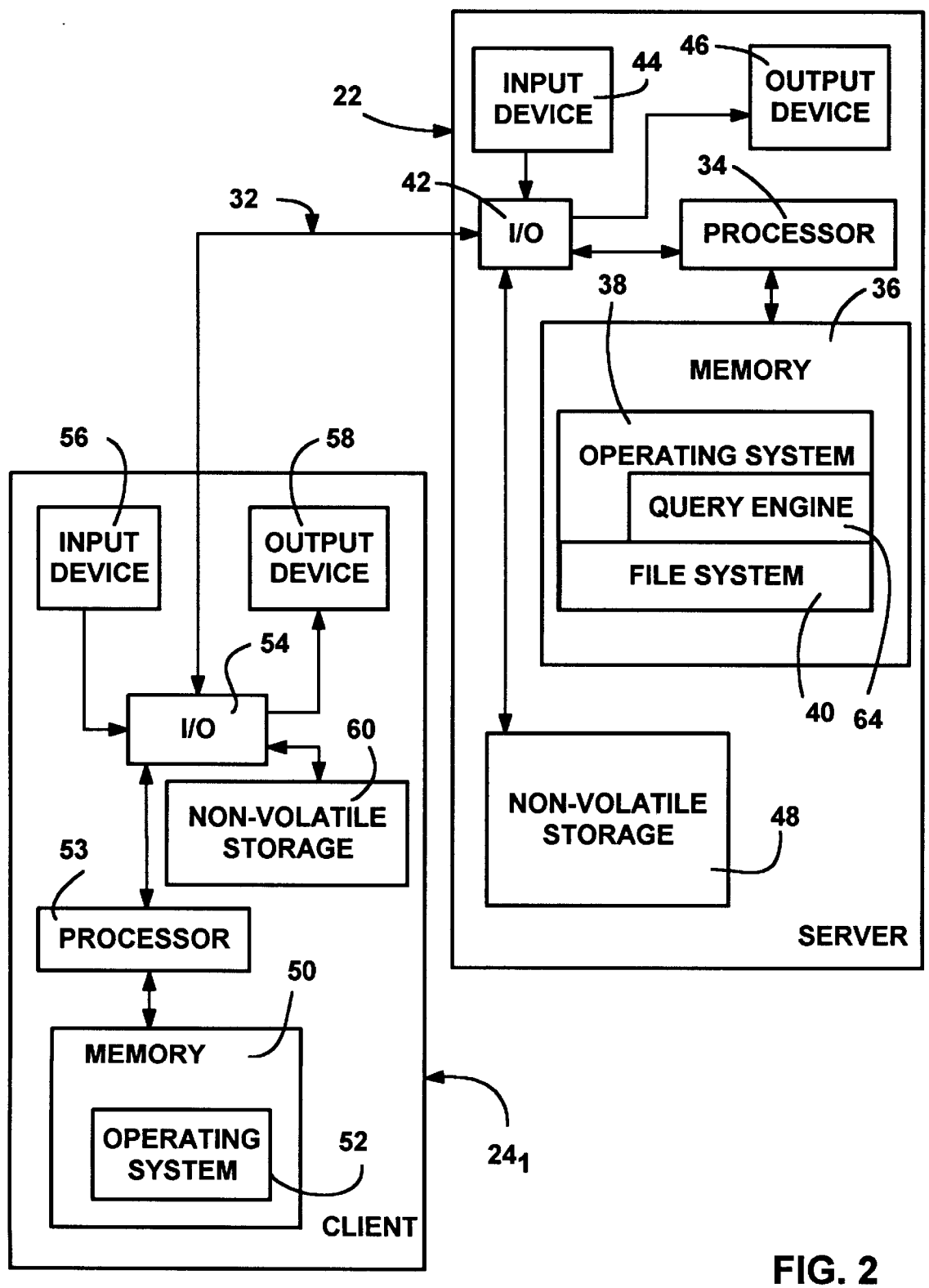
FIG. 2 is a block diagram representing hardware components in a computer system including a server and a client computer.

As best shown in FIG. 2, the server includes a processor 34 connected to a memory 36 having an operating system 38 loaded therein. Preferably, the operating system 38 is a distributed operating system such as Microsoft Corporation's Windows NT™ operating system. In keeping with the invention, the server 22 has hierarchically organized data therein, e.g., a structure of documents such as maintained in a file system 40 associated with or included within the operating system 38. A preferred file system 40 is of the type wherein documents (i.e., files, objects or the like) are capable of being organized under folders (i.e., directories, catalogs or the like), wherein each document may be under a hierarchical arrangement of folders and subfolders but has only one immediate parent folder. The server 22 also includes input-output (I/O) circuitry 42 for connecting the server 22 to one or more networked devices, to one or more input devices 44 such as a keyboard and/or mouse, and to one or more output devices 46 such as a monitor and/or speakers. The server 22 also includes non-volatile storage 48 such as the C: drive 26, D: drive 28 and E: drive 30 described above with reference to FIG. 1.

As also shown in FIG. 2, one or more of the resources, shown herein as client workstation 241, which may be a personal computer or the like, includes a memory 50 having an operating system 52 loaded therein, which may be the same type of distributed operating system 38 similarly resident in the server 22. As is typical in personal computer-based client workstations, client $24_1$ also includes a processor 53 connected to the memory 50 and to input-output (I/O) circuitry 54 for connecting the client $24_1$ to the server 22, to one or more input devices 56 such as a keyboard and/or mouse, and to one or more output devices 58 such as a monitor and/or speakers. The client $24_l$ also includes non-volatile storage 60 (FIG. 2) such as its own local C: drive $62_1$ (FIG. 1).

Figure 3:
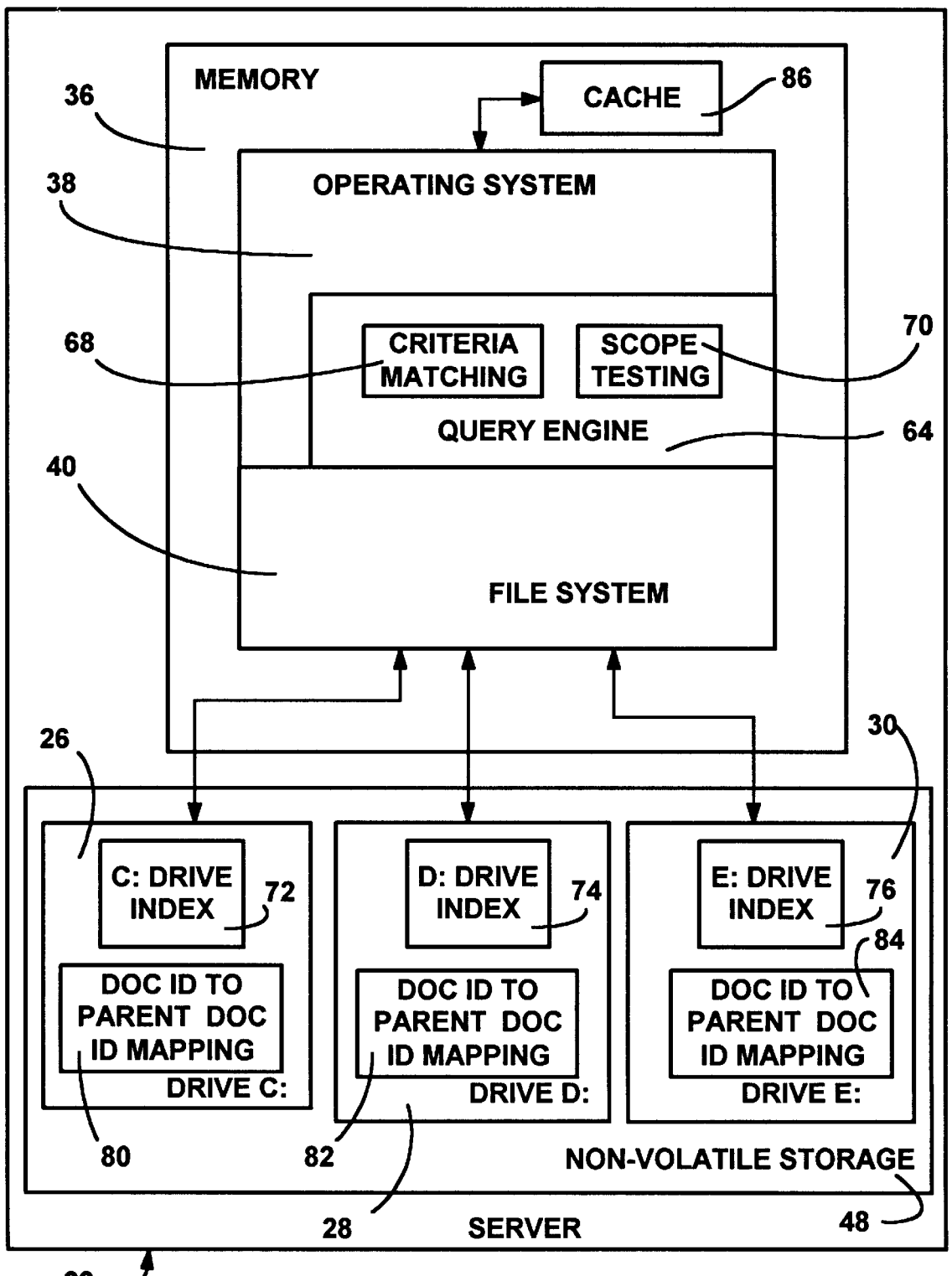
FIG. 3 is a block diagram representing hardware and software components in a server computer.

As best shown in FIGS. 1 and 3, the server 22 includes a query engine 64 which allows the user to query the file system 40 (or other hierarchically organized data) in order to locate documents which match a user-input query specification. The query engine 64 may be interfaced to a user through a program such as Windows Explorer or some other similar interface. As further shown in FIG. 1, the client devices $24_1$–$24_n$ each include a similar query engine $66_1$–$66_n$ for querying their own hierarchically organized data (e.g., their own file systems) or the hierarchically organized data (e.g., the file system 40) of the server 22. Of course, rather than replicate the query engines, the client devices $24_1$–$24_n$ alternatively may utilize the query engine 64 of the server 22 by providing the client devices $24_1$–$24_n$ with a suitable interface thereto.

As shown in more detail in FIG. 3, the query engine 64 includes two components, a criteria matching component 68 for locating documents which match a restriction, and a scope testing component 70 for narrowing the documents which match the restriction to those that are within the specified scope. The query engine 64 is associated with the file system 40, and leverages indexes 72, 74 and 76 of each of the drives 26, 28 and 30, respectively. As shown herein, an index corresponds to a given volume, however an index may alternatively span multiple volumes. Notwithstanding, as will be understood below, the present invention will operate on any retrieved documents, regardless of whether information about those documents is also maintained in an index.

Figure 4:
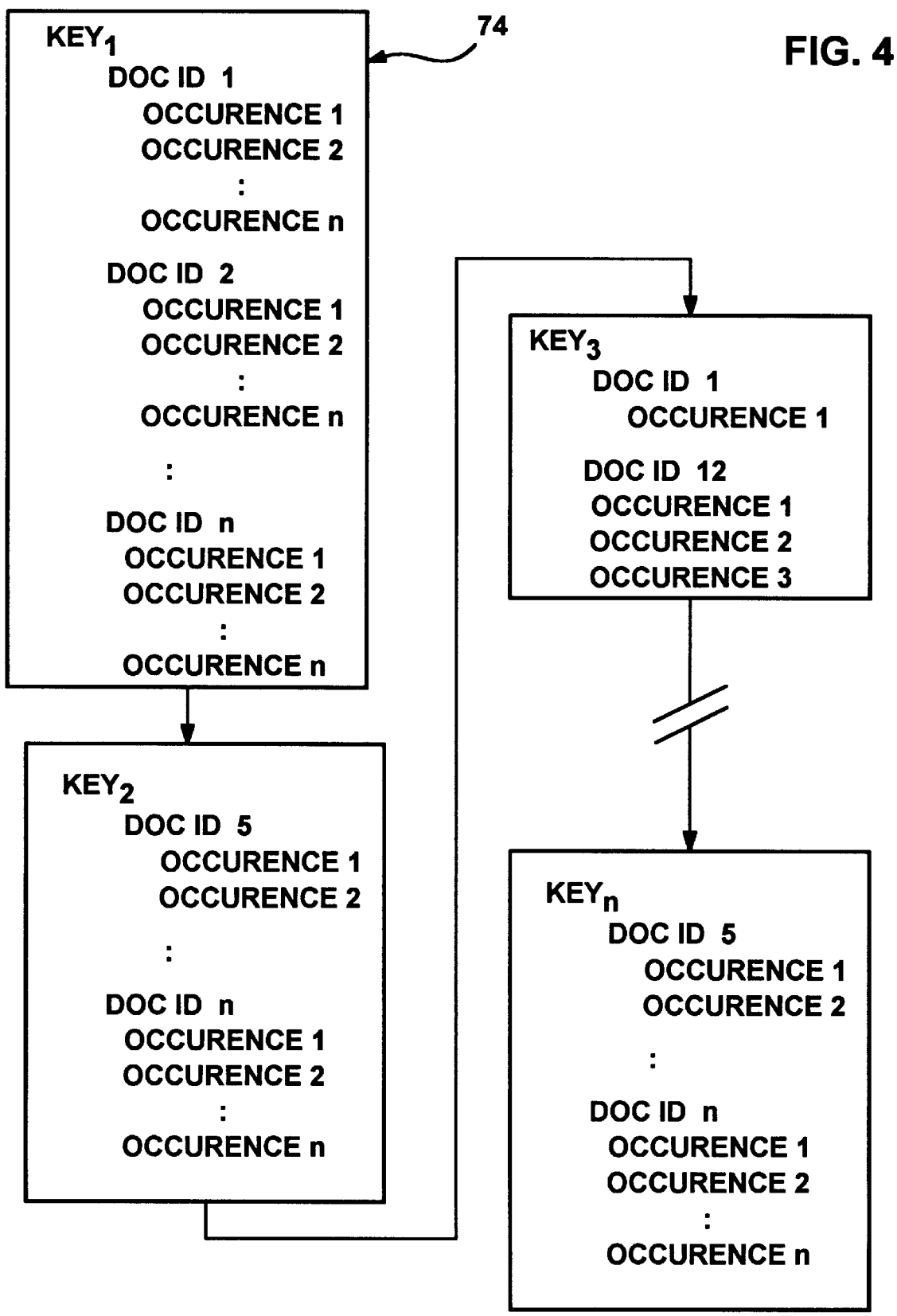
FIG. 4 is a diagram representing the general structure of an index maintained by a file system or search engine.

Preferred indexes 72–76 (FIG. 3) are generally organized as best shown in FIG. 4, and are stored as streams of bits which are bit-compressed to conserve space. The preferred bit-compression is described in U.S. patent application Ser. No. 07/986,754, assigned to the assignee of the present invention. As shown in FIG. 4, each index such as the D: drive index 74 is an inverted text index keyed by textual words ($KEY_1$–$KEY_n$), with each key (word) being either a document property value or text within the content of a document. Document properties include items such as file size, author, date created, date modified, and so on.

Beneath each key is a list of identifiers, or IDs, each of which are whole numbers uniquely identifying a document on a specific volume. Beneath each ID is a list of occurrences, or offset deltas, pointing out where that key appears in that document. Thus, as shown in FIG. 4, each key is followed by one or more document IDs, with each ID being followed by one or more occurrences of that key in the document identified by the ID. Similar inverted text index storage techniques are described in "Automatic Text Processing—The Transformation Analysis and Retrieval of Information By Computer," authored by Gerard Salton, Addison-Wesley (1989).

In any event, the operation of the criteria matching component 68 is well known and will not be described in detail herein. Suffice it to say that the criteria matching component 68 of the query engine accesses an appropriate index or the like to locate all documents stored in the index that possess the criteria set forth in a user's restriction set. The criteria matching component 68 provides document names along with each document's identifier (document ID, or doc ID) and, such as if requested in a return set, a direct or indirect reference to other properties of each document. FIG. 5 represents a list 78 of those documents, for simplicity shown herein in human-readable form and without additional document properties.

As can be appreciated, the criteria matching component 68 operates on an index 72–76 without regard to any specified scope, (other than generally looking at the drive or drives identified in the scope to determine which of the indexes to search). Thus, FIG. 5 represents the list 78 of all files which will be located in the appropriate D: drive index 74, not just those in scope. For example, if the restriction specified to "locate all documents having 'DOC*' in their filename" (where "*" represents a wildcard search term) or "all documents having the term 'budget' in the contents thereof," the query engine searches the D: drive index 74 (assuming the scope was D:\ . . . ) to obtain the list 78 of all such located documents. Note that the list 78 of retrieved documents does not necessarily physically exist in storage at a given instant, as each document is preferably scope tested as soon as it is retrieved and either added to the result set or discarded. Scope testing each document as it is retrieved enables the user to typically obtain some search results (if any) without having to wait for all documents to be fully retrieved and then scope tested. However, it is feasible to first obtain more than one document, or even to first obtain the complete list, before performing scope testing. In any event, the list of FIG. 5 conceptually represents the set of files which match the specified criteria and which may or may not be in scope.

The operation of the scope testing component 70 according to the present invention is described in detail below. In general, with the present invention, instead of prefix matching each located document, the scope testing component 70 of the present invention takes advantage of the fact that folders are almost always organized in some hierarchical manner, and that each folder typically has multiple documents logically arranged thereunder. Thus, according to one aspect of the invention and as set forth in more detail below, by using the results of prefix matching for one document, scope information on other documents that are stored under the same immediate parent folder is obtainable without executing the time-consuming prefix matching algorithm on those other documents.

Each folder corresponds to a unique identifier, either previously assigned by the file system and leveraged by the query engine, or uniquely assigned by the search engine. For example, NTFS assigns a unique identifier to each folder and document on a given volume, which may be referred to as a document identifier (even though folders are not documents). Note that if the search engine 64 uses the document identifiers in a search spanning multiple volumes, the search engine 64 need only modify the document identifier as necessary to ensure uniqueness among the multiple volumes.

A table, or cache 86 is used to store information about the scope of known folders. Initially, the cache 86 is empty, and is built up as information about the scope of a parent folder is known. More particularly, the cache 86 is used to store an "Inscope" flag for each parent folder indicative of whether a given parent folder is in scope or not in scope. The cache 86 is preferably arranged as a hash table arranged in the memory 36 (FIG. 3). Of course, if the cache 86 becomes sufficiently large or if persistency of a particular cache is desirable as set forth below, part or all of the cache 86 may be written to the non-volatile storage 48 (FIG. 3). As is well known, such as described in chapter 12 of "Introduction to Algorithms" by T. Cormen, C. Leiserson and R. Rivest, MIT Press, 1990, a hash table provides a data structure array that is proportional in size to the number of keys actually stored. A hash table may be searched, added to or deleted from, and operates in a rapid average time. Of course, other data structures may be alternatively used as the cache 86.

Figure 9:
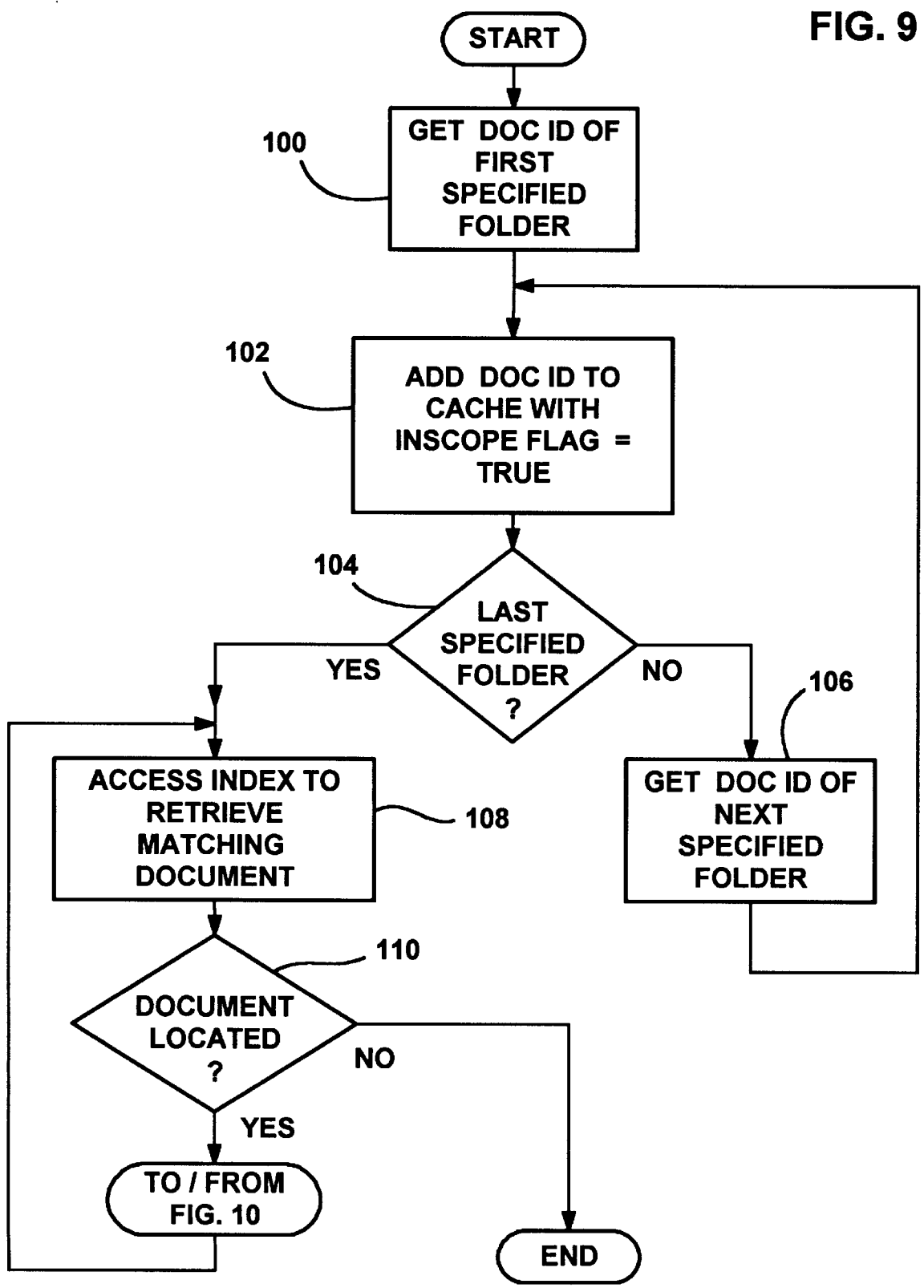
FIGS. 9–11 comprise a flow diagram representing the general steps taken in scope testing to resolve a query according to the present invention.
Figure 10:
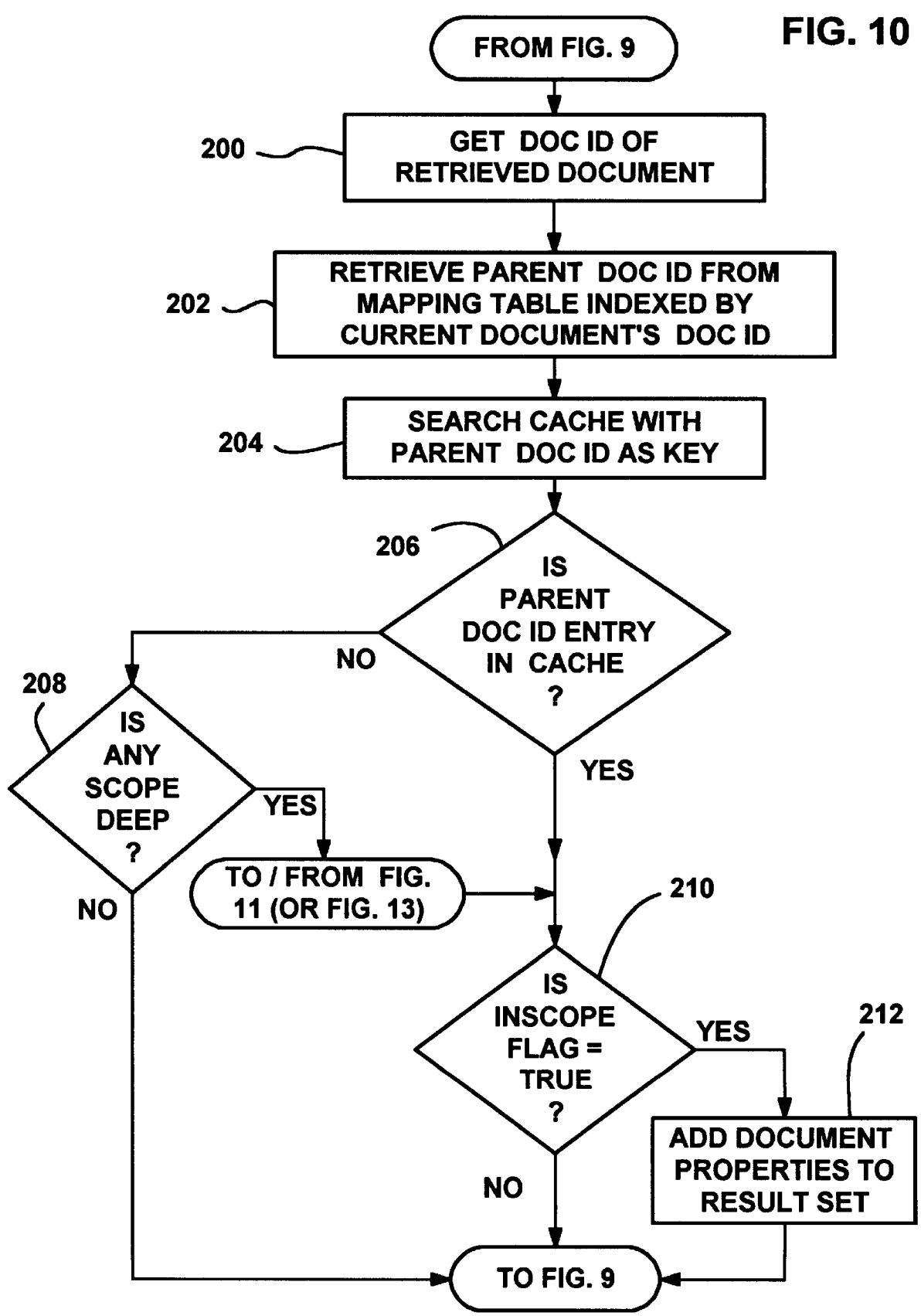
Figure 11:
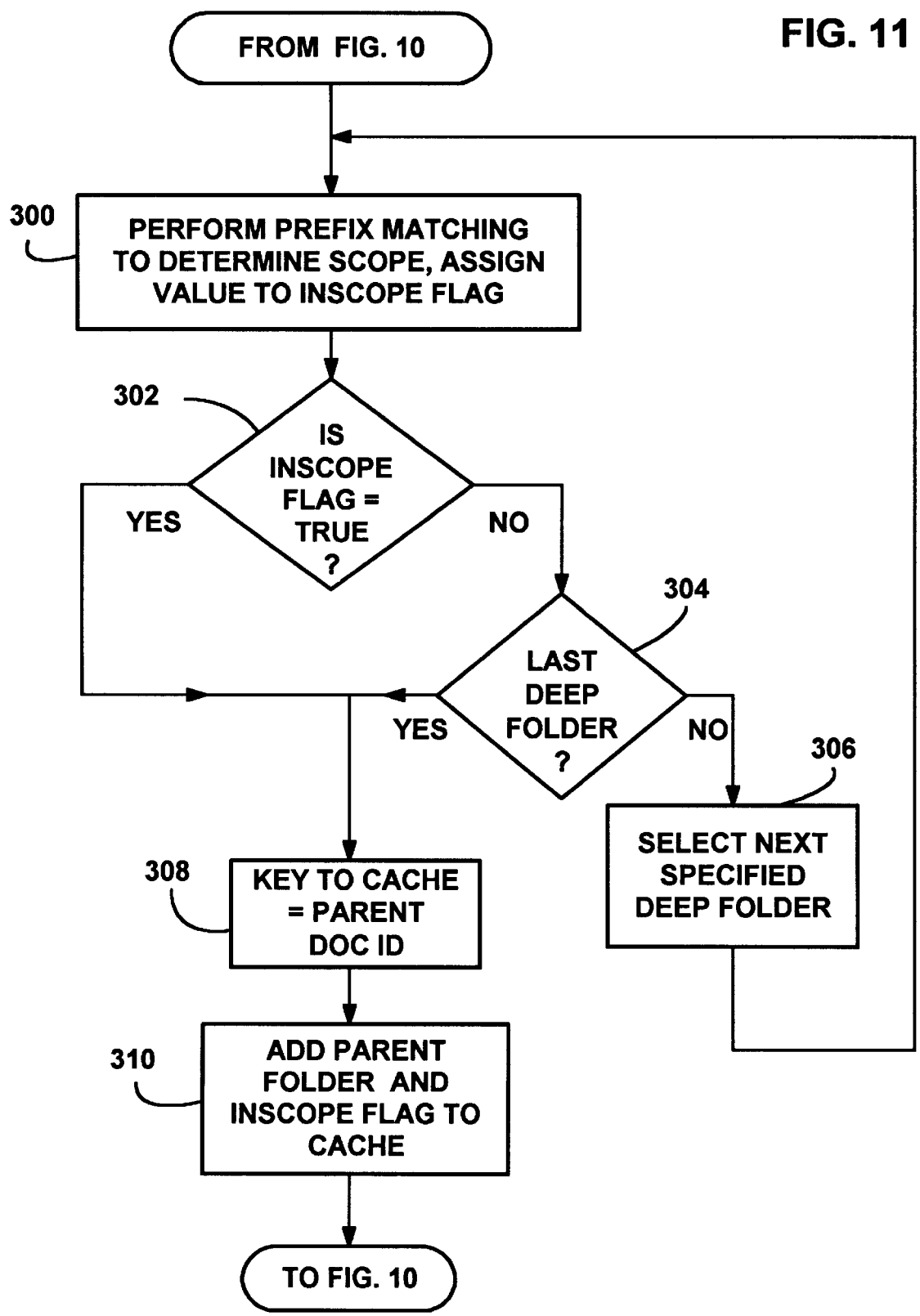

Turning to an explanation of the invention with particular reference to FIGS. 9–11, the query engine 64 first begins when it receives a query specification from a user. For example, the scope set may be specified as D:\FOLDER1\FOLDER2, D:\FOLDER87 and indicate that the search is deep for both folders, i.e., subfolders of D:\FOLDER1\FOLDER2 and D:\FOLDER87 are included. Note that in a distributed file system of NTFS, the scope can be global over all possible drives and folders.

In response, the query engine 64 may first prefill, or prime the cache 86 with scope information about certain known folders. In the present example, it is known that retrieved documents directly under folders D:\FOLDER1\FOLDER2 and D:\FOLDER87 are in scope, although sub-folder information of D:\FOLDER1\FOLDER2 and D:\FOLDER87 is not yet known. Note that from any given folder name, the document ID thereof is readily obtainable from the file system 40 or via the query engine. Thus, as shown in FIG. 6, the document ID of D:\FOLDER1\FOLDER2 equals 8, and the document ID of D:\FOLDER87 is 50.

Figure 6:
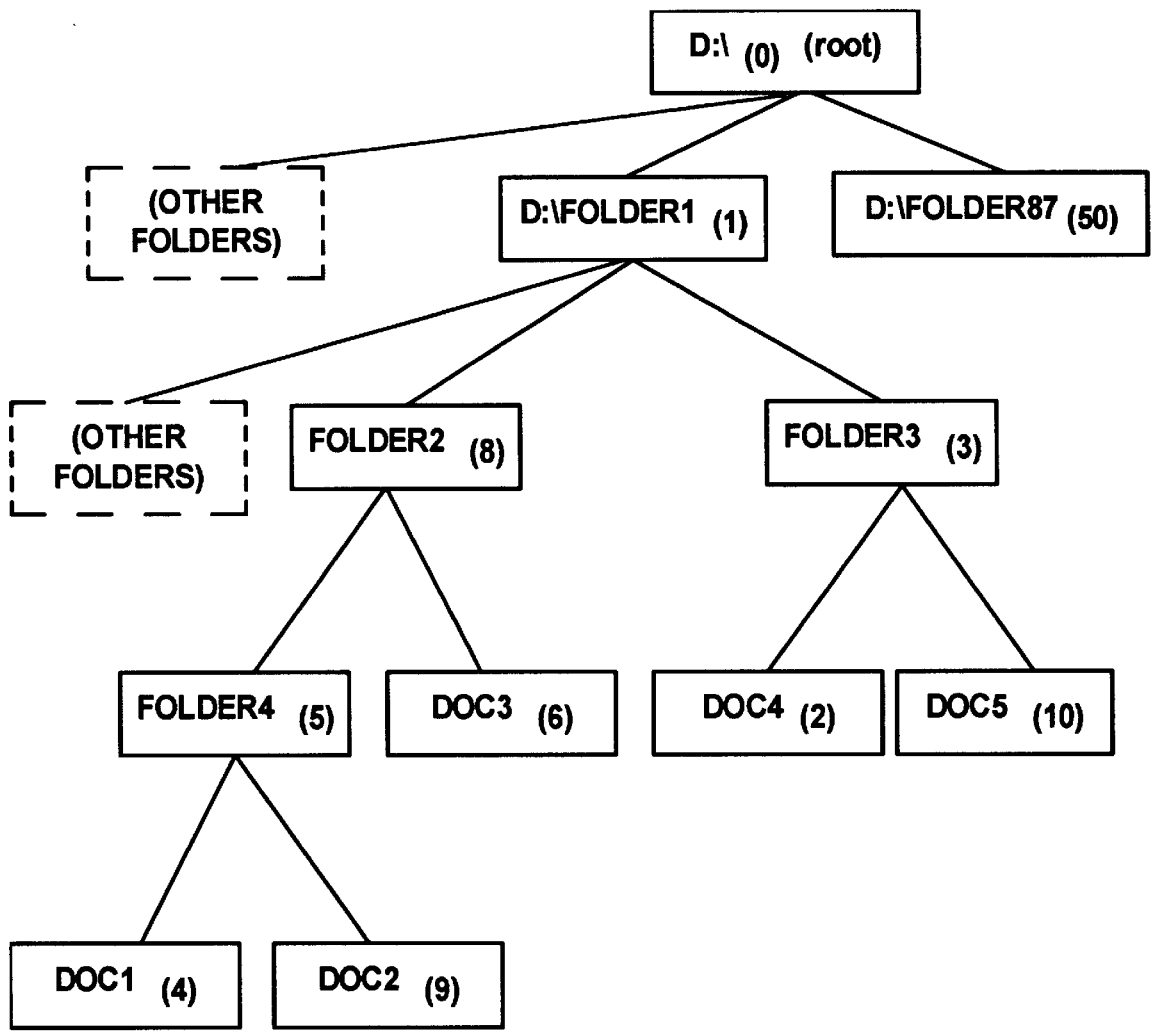
FIG. 6 is a diagram representing an exemplary hierarchical directory structure of folders and documents.

To prime the cache with this known information, at step 100 the query-resolving process obtains the document ID of the first specified folder, D:\FOLDER1\FOLDER2, which is equal to "8" as shown in FIG. 6. At step 102, the unique document ID of "8" is added to the cache 86 (FIG. 8), with the Inscope flag set to true. The priming continues as determined by step 104 until the cache is primed with scope information on the specified folders. Thus, at step 106 the document ID of 50 is obtained for D:\FOLDER87, and at step 102 the cache 86 is primed using 50 as a key and a true Inscope flag (FIG. 8).

Once the cache is primed, at step 108, the query engine retrieves (based on the user-specified criteria) a matching document. In the present example, as shown in the list 78 of FIG. 5, the first retrieved document is D:\FOLDER1\FOLDER3\DOC4, with a document ID equal to 2. Note that as shown in FIG. 4, the document ID of each document is maintained in the index 74, and, as shown in FIG. 5, is Scope testing on each document thus begins at step 200 of FIG. 10 and continues on each retrieved document until no more documents are located as determined by step 110 (FIG. 9). Of course, as is known, prior to step 200 the paths of each retrieved document in the list 78 may first be case-normalized and locale-normalized into short file names in order to speed up scope testing. Moreover, if any scope is deep, the query-resolving process may first coalesce folders listed in the scope set, whereby any folders which are subfolders nested in other folders also specified in the set are not separately searched. For example, if the scope of D:\FOLDER1 is specified as deep and the scope set specified both D:\FOLDER1 and D:\FOLDER1\FOLDER4, the scope set can be coalesced into D:\FOLDER1, since any document stored under D:\FOLDER1\FOLDER4 will also be under a deep search of D:\FOLDER1. This is valid regardless of whether D:\FOLDER1\FOLDER4 is specified as deep or shallow.

Figure 7:
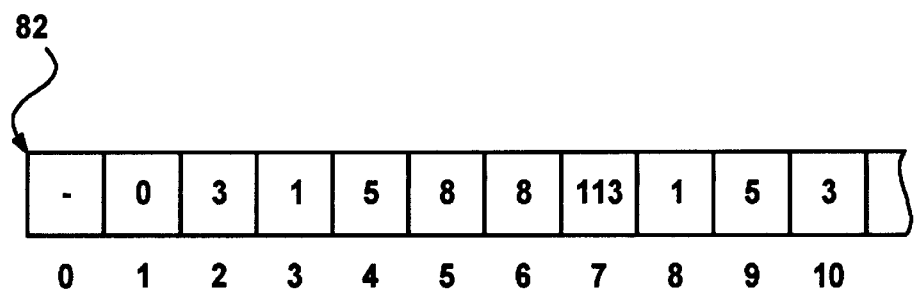

As shown in FIG. 7 and as described above, for each volume, e.g., drive D:\, (or across multiple volumes), the search engine 64 and/or the file system 40 maintains a densely packed document ID to parent-document ID mapping array 80, 82 and 84. In the present example, the array is the mapping table 82, from which the document ID of any document's parent folder is rapidly obtained using the document ID of that document as a direct-addressing index thereto. Thus, in the present example, the first document located was D:\FOLDER1\FOLDER3\DOC4, having a document ID equal to 2 (FIG. 5). Using "2" as an index to the document ID to parent document ID mapping table 82 (FIG. 7), the document id of the immediate parent folder (D:\FOLDER1\FOLDER3), equal to "3," is obtained at step 202. Note that although a file system such as NTFS directly maintains such a mapping table 82 for each volume, mapping information equivalent to that kept by the mapping table may be directly or indirectly obtained from virtually any hierarchically organized data or file system. Indeed, the present invention is not limited to any particular document-to-parent mapping, but on the contrary is fully extensible to any existing or future hierarchically-organized data or file system wherein information about a document's parent or the like may be obtained or derived from the document information.

In keeping with the invention, once the parent document ID equal to 3 is obtained, at step 204 the cache 86 is searched using the parent document ID of 3 as the key. In the present example, the cache 86 was not primed with this sub-folder information, so the cache searching process at step 204 (FIG. 10) returns a value such as a null, minus one or some other errorcode indicating that the parent folder (key equals 3) did not have an entry therefor. Thus, since no entry is present, at step 206 the query-resolving process branches to step 208. At step 208, the scopes are checked to determine if any one specified scope is deep, since, as described in detail below, shallow and deep queries have different implications at this point.

In the present example, at least one scope is deep, and thus the process branches to step 300 of FIG. 11 where a test such as the prefix matching algorithm is performed to determine if the parent folder (D:\FOLDER1\FOLDER3) is in scope. As is known, prefix matching performs a string-based comparison of the folder's full path name against each of the path names specified in the specified scope set. As evident from the tree shown in FIG. 6, wherein the document ID of each folder and document is shown in parentheses below the name of the folder or document, prefix matching determines that D:\FOLDER1\FOLDER3 is not in the requested scope of D:\FOLDER1\FOLDER2. Thus, at step 300, the Inscope flag for D:\FOLDER1\FOLDER3 (document ID equals 3) is assigned a false value, typically zero, indicative of the not-in-scope status, causing the process at step 302 to branch to step 304. At step 304, a test is performed to determine if all of the folders specified as deep in the scope set have been prefix tested. In the present example, D:\FOLDER87 has also been specified as deep, so at step 306 D:\FOLDER87 is selected and the process returns to step 300 to prefix match D:\FOLDER1\FOLDER3 against D:\FOLDER87. Since these folders do not match, the Inscope flag remains false and step 302 again branches to step 304. This time, however, D:\FOLDER87 is the last specified folder, so step 304 branches to step 308, where the key to the cache (hash table) 86 is set equal to the parent document ID of 3. At subsequent step 310, an entry into the cache (hash table) 86 is made for the key of 3 associated with the Inscope flag value, e.g., zero. Note that FIG. 8 represents the cache 86, although it should be understood that only the first three entries (i.e., the primed entries of 8, 1 and 50, 1, along with the most recent entry of 3, 0) are present at this time.

The query process returns to FIG. 10 and continues to step 210, wherein a test is performed on the Inscope flag to determine if the document was in scope. Since the document was not in scope, the process returns to step 108 of FIG. 9 (instead of branching to step 212 to add the document to the result set).

Step 108 of FIG. 9 accesses the index to gets the next document that matches the criteria. Since there is another document, D:\FOLDER1\FOLDER3\DOC 5 in the list 78, at step 110 the process returns to step 200 of FIG. 10 wherein this document's document ID equal to 10 is obtained.

As before, at step 202 the mapping table 82 (FIG. 7) is referenced, and using the mapping table of FIG. 7 with the document document ID of 10 as an index, step 202 returns a "3" as the document identifier of DOC5's immediate parent folder, D:\FOLDER1\FOLDER3. This time through the loop, however, by searching the cache 86 at step 204, an entry is determined to be present in the cache 86 for the key of 3, from which the cache 86 returns an Inscope flag value therefor (equal to zero). Thus, the process branches to step 210 where the Inscope flag is tested and determined to be false, thereby causing the process to return to step 108 of FIG. 9. Thus, unlike the previous document, DOC4, prefix matching for DOC5 was unnecessary, since the scope of the parent folder (D:\FOLDER1\FOLDER3) is known from the cached Inscope flag. As can be appreciated, rather than performing the time-consuming prefix matching algorithm more than once, the cache 86 allows the scope of any other document having D:\FOLDER1\FOLDER3 as its parent folder (document ID of 3) to be rapidly determined as not in scope. Since with large searches a large number of documents may share this parent folder, the time savings may be multiplied many times.

At steps 108 the next document is retrieved, D:\FOLDER1\FOLDER11\MSOFFICE\SHEET4.XLS (FIG. 5), and thus at step 110 the process branches to step 200. As can be appreciated from an analysis of the path strings, the next three documents having the common parent folder "D:\FOLDER1\FOLDER11\MSOFFICE" are not in the specified scope. Following the steps described above, in accordance with one aspect of the invention, only the first of these three ("SHEET4.XLS") is prefixed matched as shown in FIG. 11. As before, once the first parent folder is prefix matched, its key (for example, the document ID and thus the key for D:\FOLDER1\FOLDER11\MSOFFICE equals 90) is placed in the cache 86 along with a scope flag of zero therefor. For the next two documents, an entry for parent folder 90 is in the cache 86 rendering prefix matching for these documents unnecessary. Note that with prefix matching, priming the cache with deep folders is not necessary.

Continuing with the example shown in FIG. 5, the next document is "D:FOLDER1\FOLDER2\FOLDER4\DOC1," and is retrieved at step 108. As shown in FIG. 5, this document has a document ID of 4. From the document ID to parent document ID mapping table of FIG. 7, the document ID of the immediate parent folder equal to "5" is obtained at step 202. At step 204, the parent document ID of 5 is used as a key to the cache 86. At this time, the cache 86 does not have an entry for a key of 5, and thus returns a value indicative of no entry. Thus, at step 206 the process branches to step 208, and, because a specified scope is deep, continues on to step 300 of FIG. 11.

At step 300, the prefix matching algorithm is performed and determines that D:\FOLDER1\FOLDER2\FOLDER4 is in scope. As a result, the Inscope flag for the document ID of 5 is assigned a true value, typically one, indicative of the in-scope status. Because the document is in scope, step 302 branches to step 308.

In keeping with the invention, at step 308, the key to the cache (hash table) 86 is set equal to the parent document ID of 5, and at step 310, an entry into the cache 86 is made for the key of 5 associated with the true Inscope flag value, e.g., one. At this time FIG. 8, which represents the cache 86, would have five entries therein.

The query process returns to FIG. 10 and continues to step 210, wherein a test is performed to determine if the Inscope flag is true. Since the Inscope flag is true at step 212 DOC1's properties are added to the result set 90 (FIG. 12). Note that in the present example, the properties specified in the return set for this query were document name, size and creation date. Of course, if other properties were specified, these would be returned (barring other reasons such as security tests for not returning a given document's information). The process then returns to step 108 of FIG. 9, to retrieve the next document, if any.

As can be appreciated, the process continues in the above-described manner for the other documents listed in FIG. 5, filling in the result set as shown in FIG. 12. Note that when D:\FOLDER1\FOLDER2\FOLDER4\DOC2 is tested, prefix matching will not be performed. This is because its document ID is 9 (FIG. 5), which has a parent document ID equal to 5 (FIG. 7). As a result, at step 206 an entry will be found in the cache 86 causing the process to branch to step 210. As described above, because the Inscope flag is true for this entry of 5, step 210 will branch to step 212 where DOC2's properties will be added to the result set 90 (FIG. 12). Thus, it is seen that once a document's parent folder is prefix matched, the cache 86 eliminates further prefix matching for other documents sharing the same parent folder, regardless of whether the prefix matching algorithm ultimately determined that the parent folder was in scope or not in scope.

Finally, at steps 108–110 of FIG. 9, all of the matching documents will have been retrieved and scope tested. At this time, the process ends.

To demonstrate the operation of the query return process with a shallow query, the previous example again will be used but with the scopes having been specified as shallow. If the scopes are shallow, then only documents directly under the specified parent folders will be in scope. Consequently, only documents mapped to a parent folder having a document ID that is equal to a document ID of one of the folders specified in the scope set are in scope. For example, using the hierarchical organization shown in FIG. 6, if the scope is shallow and specified as D:\FOLDER1\FOLDER 2, D:\FOLDER87, then only located documents that directly map to a parent folder with a document ID of either 8 or 50 are in scope. Thus, from FIG. 6, only DOC3 is in scope. Note that unlike the previous deep query, DOC1 and DOC2 are not in scope with the shallow query since they are under FOLDER4 and are thus only indirectly under FOLDER2. As described below, in this example, scope testing as exemplified in the flow diagrams of FIGS. 9 and 10 will eliminate all other documents and add only DOC3 to the result set without performing any prefix matching.

Beginning at steps 100–106 of FIG. 9, the cache 86 is primed as before, and, since, the criteria is the same in this example, the steps 108–110 will ultimately retrieve the same documents as those shown in the list 78 of FIG. 5. At steps 200–206, the document ID of each document will be used to obtain the parent document ID and search the cache 86 as before. Thus, the first document is D:\FOLDER1\FOLDER3\DOC4, which has a document ID of 2 (step 200). From the document ID to parent document ID table 82 of FIG. 7, step 202 returns the parent document ID of DOC4 equal to 3. Using a 3 as the key to the cache, step 204 returns a value or other errorcode indicating that 3 is not present in the cache, whereby the cache entry test at step 206 branches to step 208.

However, unlike the previous example, at step 208 the scopes are determined to be shallow, and thus the process need not test the document further. This is because any shallow folders would have been previously primed in the cache 86 as true. Since the immediate parent folder's document ID was not in the pre-primed cache, it is known to be not in scope, since priming added the IDs of all folders that are directly in scope.

Thus, step 208 returns to step 108 of FIG. 9, where the next document is retrieved for testing in the same manner. As can be appreciated by following the steps of FIG. 10, none of the documents in the list 78 (FIG. 5), other than D:\FOLDER1\FOLDER2\DOC3, will be in scope. When D:\FOLDER1\FOLDER2\DOC3 is retrieved (step 108), its parent document ID retrieved at step 202 will equal 8. At that time, step 204 finds an entry for the value 8 in the cache 86. Since all shallow entries in the cache 86 have been primed as true, for DOC3, step 210 branches to step 212 where the properties of DOC3 are added to the result table. As can be seen, with the present invention, by priming the cache, prefix matching never need be performed for queries where all scopes are specified as shallow.

Figure 13:
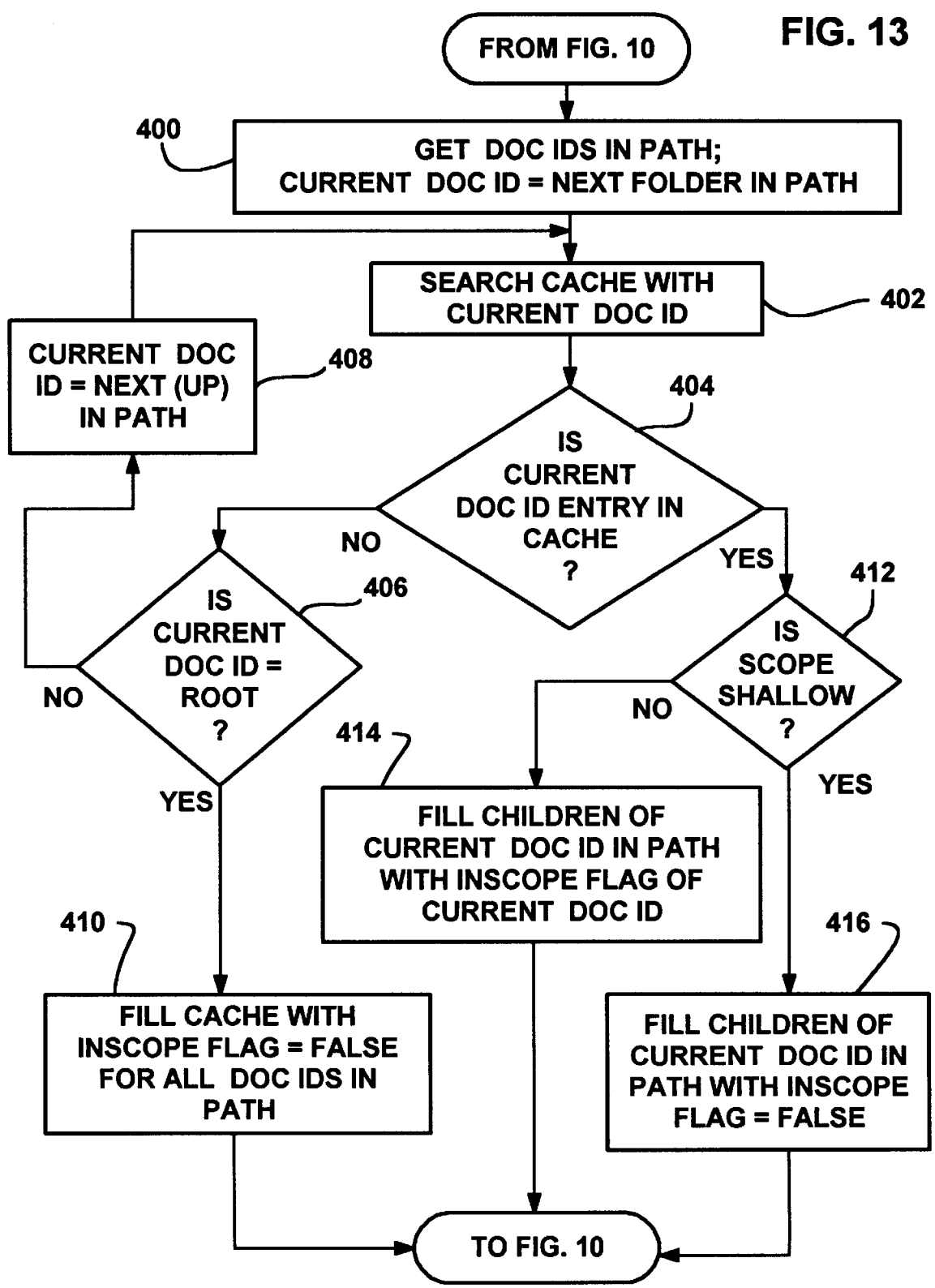
FIG. 13 is a flow diagram representing alternative steps taken in scope testing to resolve a query according to the present invention.

In an alternative embodiment, when a scope is specified as deep, rather than prefix match to test for scope, the process may instead continue to step 400 of FIG. 13 where the path of the document's folders is converted into a set of folder document IDs and analyzed to determine scope. For example, D:\FOLDER1\FOLDER3 corresponds to a set of document IDs 3, 1 and 0 (root). Moreover, in this alternate embodiment, certain information may be obtained from or deduced about a document's grandparent folder or other higher level parent folders. In particular, if a document's immediate parent folder entry is not found in the cache 86, but a higher level parent is found and is in scope and deep, then that document and all known folders below the higher parent folder that is in scope are also in scope. Of course if a higher level parent is entered in the cache 86 but is not in scope, it is not known whether lower level folders might still be in scope unless and until a test is performed on those lower level folders.

Similarly, if a document is determined to be not in scope, it may be concluded that none of the higher level folders above that document are in scope and deep. However, if the document is in scope, no useful information about higher level parents is known because the document's grandparent folder (and/or any above) may be in or out of the specified scope.

Figure 14:
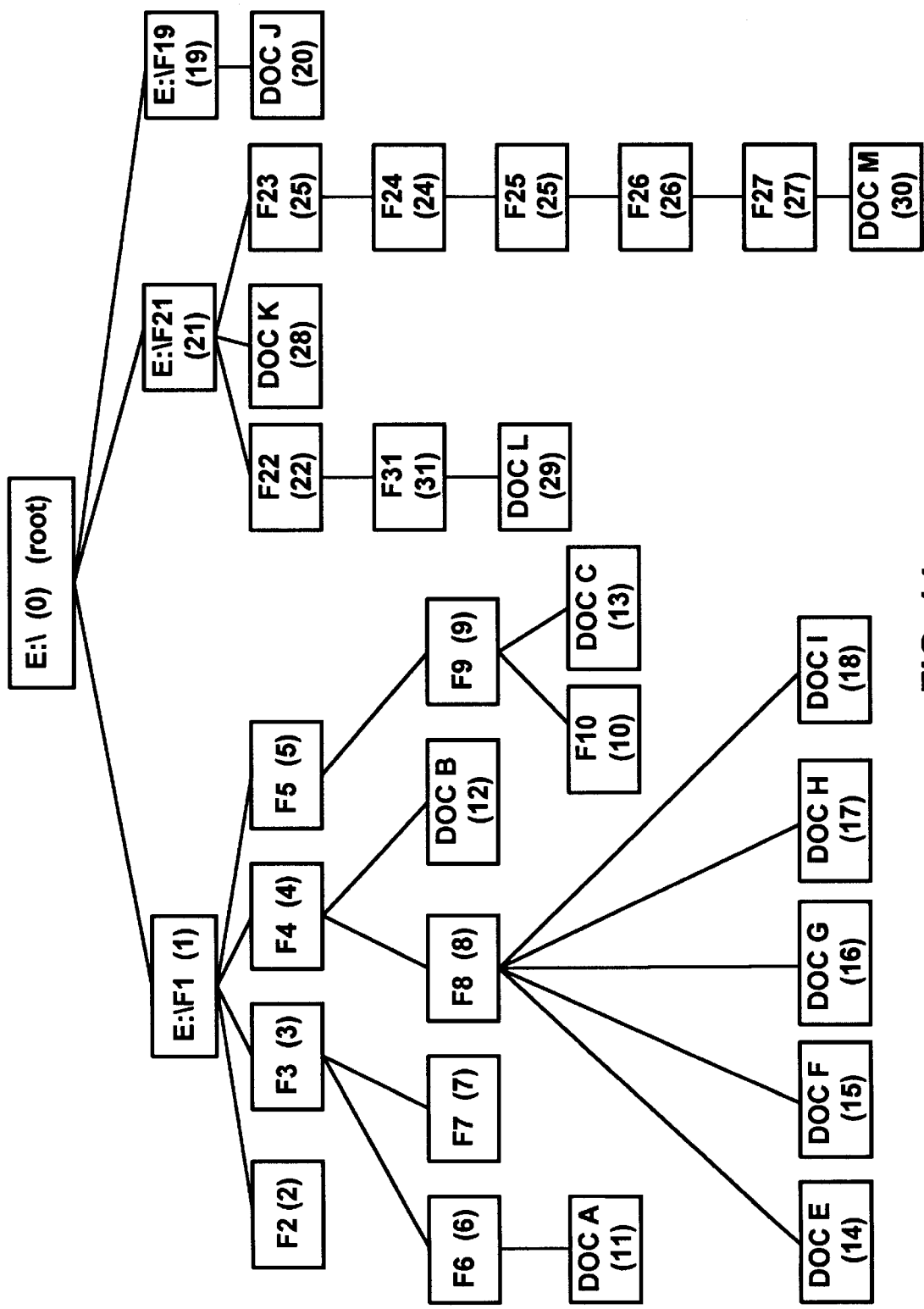
FIG. 14 is a diagram representing an alternative exemplary hierarchical directory structure of folders and documents.

FIG. 13 shows the use of the document's path to determine scope and rapidly fill a cache. In this alternative embodiment, FIG. 13 may be substituted for FIG. 11. For purposes of this example, FIG. 14 shows a hierarchy of folders and documents stored in the E: drive 30, wherein the document ID of each folder and document is shown in parentheses below the name of the folder or document. Moreover, for the following example, a modified cache 98 (including a flag indicating shallow scope, as described below) is shown in FIG. 15. In the following example, it is assumed that criteria matching returns DOC A, DOC B, DOC G, DOC H, DOC M, DOC K and DOC L, in that order. Further, the query seeks matching documents in the path E:\F21\F22, specified as shallow, or in the paths "E:\F1\F4" or "E:\F19," specified as deep.

Thus, as shown in FIG. 15, the cache 98 is first pre-primed (steps 100–106 of FIG. 9) with 22, 1, 1; 4, 1, 0; and 19, 1, 0, where the last value in each of the three entries is a flag indicating shallow scope (1) or deep scope (0). Note that the Inscope and Shallow flags may be distinct bits of a single byte. Although more than three entries are shown in FIG. 15, it is understood that only the first three entries are present in the cache 86 at this time.

Thus, step 108 of FIG. 9 retrieves DOC A, which at step 200 (FIG. 10) is determined to have a document ID of 11 (FIG. 14). Using a document ID to parent document ID mapping table or the like, step 202 determines that the immediate parent folder document ID of DOC B is 6 (for folder F6, FIG. 14). The cache 98 is searched at step 204, and, since there is no entry for 6, the process branches to step 208, where it is determined that at least one specified scope is deep. In this embodiment, the process then continues to step 400 of FIG. 13 (instead of FIG. 11).

Step 400 obtains the document IDs of all folders in the path of DOC 11, that is, 6, 3, 1, 0, using an appropriate document ID to parent document ID table or the like. Step 400 sets the current document ID to the next up in the path, the parent folder's document ID of 3, since folder F6 with a document ID of 6 has already been used as a key without success. The next step, step 402, searches the cache 98 with the current document ID of 3. Since 3 is not in the cache 98, step 404 branches to step 406 where a test is performed to determine if the current document ID is that of the root directory, in which case no further parents are available. In the present example, other parents exist, and this the process branches to step 408 where the current document ID is set equal to the parent document ID of 1 (of the parent folder F1). The cache 98 is then searched with the new current document ID of 1.

As can be appreciated from FIG. 14 and the steps 402–408 of FIG. 13, the cache 98 will not have an entry for this particular path and the root directory will be detected at step 406. At this time, it is known that the entire path is not in scope, since if any higher level folder was in scope, the cache 98 would have been primed with that folder's document ID and an Inscope flag of true. Accordingly, step 410 fills the cache 98 with false (zeros) for the Inscope flags of folders F6, F2, F1 and root corresponding to document ID keys of 6, 2, 1 and 0, respectively. The process returns to step 210 of FIG. 10 where the false Inscope flag returns the process to step 108 of FIG. 9 to retrieve the next document.

The next document retrieved is DOC B, having a document ID of 12 (step 200 of FIG. 10) and a parent document ID of 4 (step 202) as shown in FIG. 14. Since, due to priming the cache 98, an entry of 4 is present in the cache 98 with an Inscope flag of true, step 202 branches to step 210, which in turn branches to step 212. The process then adds DOC B's properties to the result set at step 212 and returns to step 108 of FIG. 9.

Continuing with the example, DOC G is next retrieved at step 108. As shown in FIG. 14, DOC G has a document ID of 16 (step 200 of FIG. 10), with a parent folder F8 document ID of 8 (step 202). No entry is in the cache 98 (FIG. 15) for this folder, and thus step 206 of the process branches to step 208, where the (at least one) specified deep scope causes the process to continue to step 400 of FIG. 13.

At step 400, the document IDs of the path of DOC G are obtained, i.e., 8, 4, 1 and 0, and the current document ID is set to the ID of the next folder in the path, 4. This time, however, step 402 returns an Inscope flag of True for this document ID key of 4 (along with a "Shallow" scope flag of False as described below, i.e., the scope of folder F4 was not specified as shallow). Accordingly, step 404 branches to step 412, where the Shallow scope flag is tested, causing the process to branch to step 414. At step 414, all known children of the current document ID of 4, in this case only folder F6 with document ID of 8, are added to the cache 98 (FIG. 15) with an Inscope flag of true and a Shallow flag of false. This is possible because since folder F4 was in scope and the scope is deep, all known folders below folder F4 are also in scope. In the present example only folder F8 is known to be below F4, but in other instances an entire chain of folders may be known to be below a folder in scope, in which event the entire chain may be added. As can be seen, this rapidly fills the cache 98. The process then returns to step 210 of FIG. 10.

Because the Inscope flag is true, step 210 branches to step 212 where DOC G's properties are added to the result set. The process returns to step 108 of FIG. 9, where DOC H is next retrieved. Because of filling the cache 98 with information obtained from DOC G, when the next document, DOC H, is scope tested, it will be quickly determined by steps 200–210 (FIG. 10) to be in scope.

Next, however, when DOC M is tested, DOC M will not be in scope. Following FIGS. 10 and 13 in conjunction with FIG. 14, it is seen that neither DOC M's immediate parent folder F27 nor any higher level folder of DOC M (F21 and F23 through F26) has an entry in the cache 98 at this time, except for the root directory with a document ID of 0. Thus, steps 400–408 will, via step 404, ultimately branch to step 412. Because the root directory was not specified as shallow, the known children, i.e., 27, 26, 25, 24, 23 and 21, will be filled with the value of the current document ID's Inscope flag value, the root directory's Inscope flag equal to false. This is possible because each folder in the entire path E:\F21\F23\F24\F25\F26\F27 was effectively tested, with no higher level folder having been primed as in scope. In this manner, the cache is rapidly filled with false values for these folders.

When DOC K is next selected, the key 21 (document ID 21) is already stored in the cache as a false. As a result, steps 200–210 will return the process to step 108 of FIG. 9 to retrieve the next document.

Lastly, with DOC L, F31 does not have an entry therefor in the cache. F21, further up the chain, does have a false entry, but it does not necessarily follow that either F31 or F22 is false. Thus, the process walks up the chain, rather than attempt to shortcut the process in some manner. Accordingly, steps 200–208 determine that F31 is not in the cache 98, and thus branch to step 400 of FIG. 13.

At steps 400–404, E:\F21\F22, with a document ID of 22 (FIG. 14) is determined to be in scope, but its Shallow flag indicates it is shallow. As a result, step 412 branches to step 416 based upon certain information. In particular, assuming proper coalescing, no folder above a shallow folder has been specified as deep, otherwise the shallow folder will have been coalesced into the deeper folder. Moreover, if any folder below a shallow folder but above the retrieved document is in scope and specified as deep, priming the cache 98 ensures that such a folder would have been found in the cache 98 before reaching the shallow folder while walking up the chain. Since no such folder was found, the known children in the current path are not in scope and can be added to the cache 98 with false Inscope flags. In the present example, only F31 is known, and thus step 416 adds a 31 to the cache 98 with an Inscope flag of 0 and a Shallow flag of 0. This is one purpose of maintaining the Shallow scope flag in the cache 98. Note that if proper coalescing is not performed, a shallow folder further up in the path needs to be treated as if it was not in the cache at step 404, but never overwritten with a false for its Inscope flag at steps 410 or 414.

Step 416 returns to step 210 of FIG. 10 where the false Inscope flag returns to step 108 of FIG. 9. This time however, no more documents are retrieved and thus via step 110 the process ends. In sum, the alternative embodiment of FIGS. 9, 10 and 13 returned only those documents, DOC B, DOC G, and DOC H which were properly in scope without performing any prefix matching. At the same time, the cache 98 was rapidly filled so that other documents can be quickly scope tested.

As can be appreciated, in either described embodiment the substantial reduction or elimination of prefix matching along with the rapid filling of the cache provides substantial time savings. Indeed, although it is feasible to conceive of a scenario in which use of a cache actually adds total time to the scope testing, (e.g., only one document per folder, each of which has to be separately prefix matched or a long chain examined), in practice such an event should rarely, if ever, occur. When large numbers of files are located, scope testing according to the present invention is almost always substantially faster. However, even under such atypical circumstances, the time costs of using the present invention are trivial compared to the benefits obtained thereby with typical queries and folder arrangements. Of course, it is feasible to conceive of an alternate mechanism wherein a test (e.g., testing for a threshold number of located documents) is preliminarily conducted to determine whether to use a cache 86 or the like according to the present invention, or instead just perform prefix matching.

Likewise, it is also feasible to include scope information in an index, whereby criteria matching and scope testing are effectively combined into a single process. However, including scope information in the index has costs and other problems associated therewith. For example, one way to accomplish this would be to name each folder individually in the index. In this case, one key would be each folder name. However, a search would then require many search keys, which adds considerable time to the search. Alternatively, each path could be stored as a composite key. However, every time a file or folder was renamed, for example, a considerable amount of updating would have to be performed on the index to keep the index current. In short, although possible, placing scope information in an index is not believed to be practical.

Lastly, a folder or document placed in a cache or in a result set may be created, renamed or deleted while the query is being resolved. Moreover, it can be appreciated that for a given scope, a cache may be persistently stored in non-volatile storage 48. For example, if the number of scopes that a user may select from are limited, a cache may be permanently stored for each available scope. Likewise, if one or more particular scopes are frequently selected by users, one or more caches may be stored for each of these most-frequently selected scopes. Thus, in the case wherein a result set or a cache is persistently stored for later use, the status of a document or folder may similarly change between the time of storage and the time of later use.

In any of these instances, it is feasible to update the result set or a cache based on the status change of a folder or document. To this end, Windows® provides application programming interfaces (APIs) that provide notifications to the query or other process. These WIN32-APIs, named FindFirstChangeNotification and FindNextChangeNotification in NTFS, provide change notifications comprising the document ID of the changed folder or document and the type of change, e.g., rename or delete, whenever a change is made to a folder or document.

Using these APIs, the query process may monitor changes to documents. For example, if a delete notification is received, a hash table cache is searched for the corresponding document ID, and if an entry is found, the entry is deleted because the entry's scope information is no longer valid. If a rename notification is received, the hash table is similarly searched. If an entry is found in the hash table for the document ID, the renamed item must be a folder, and thus prefix matching is performed on the new folder name so that the Inscope flag for that folder may be updated. Finally, as can be appreciated, result sets may be similarly adjusted, even if the query is still being resolved, and, in the case where a query is being resolved, a retrieved document that has not yet been scope tested may be similarly added to, deleted from, and/or renamed via these APIs.

As can be seen from the foregoing detailed description, there is provided a method and mechanism that substantially improves the querying of a file system, particularly for queries dealing with large numbers of documents. The method and mechanism substantially decreases the amount of time taken to resolve a query, and substantially decreases the amount of time taken to scope test criteria-matched documents. The method and mechanism functions with existing file systems and is extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a hierarchically-organized system of documents and folders, a method of responding to a query with at least one document that matches a specified scope from among one or more documents which have been retrieved based on specified criteria, the method comprising the steps of:

selecting a retrieved document as a current document;

obtaining an identifier of the current document;

obtaining an identifier of a parent folder of the current document;

accessing a data structure to determine scope information of the current document, the data structure including a flag indexed by the identifier of the parent folder wherein the flag has a value indicative of the whether the current document is in scope; and returning information for the current document in response to the query when the value of the flag equals a predetermined value.

2. The method of claim 1 wherein the step of obtaining the identifier of the parent folder comprises the step of retrieving the identifier of the parent folder from a document identifier to parent document identifier mapping table.

3. The method of claim 2 wherein the step of retrieving the identifier of the parent folder includes the step of using the document identifier of the current document as an index to the document identifier to parent document identifier mapping table.

4. The method of claim 1 wherein the step of returning information for the current document comprises the step of placing information about the current document in a result set.

5. The method of claim 1 wherein the data structure comprises a hash table.

6. The method of claim 1 further comprising the steps of selecting another retrieved document as a second current document, obtaining an identifier of the second current document, obtaining an identifier of a second parent folder of the second current document, accessing the data structure with the identifier of the second parent folder as an index thereto, receiving a value from the data structure indicating that the identifier of the second parent folder does not correspond to an entry in the data structure, comparing the second parent folder with the specified scope, and adding an entry to the data structure indexed by the identifier of the second parent folder, the entry including a value indicative of whether the second parent folder corresponds to the specified scope.

7. The method of claim 6 wherein the step of comparing the second parent folder with the specified scope includes the steps of obtaining an identifier of a third folder which is hierarchically above the second parent folder, and accessing the data structure with the identifier of the third parent folder as an index thereto.

8. The method of claim 6 wherein the entered value indexed by the identifier of the second parent folder is equal to the predetermined value when the second parent folder corresponds to the specified scope.

9. The method of claim 1 wherein the parent folder is an immediate parent folder of the current document.

10. The method of claim 1 wherein the query specifies at least one folder, and further comprising the step of priming the data structure with a flag indexed by an identifier of the at least one folder, the flag having a value indicating that the at least one folder is in scope.

11. The method of claim 1 wherein the flag indicates that the document is in scope, and further comprising the steps of obtaining an identifier of a folder hierarchically below the parent folder, and entering at least one additional flag into the data structure indexed by the identifier of the folder below the parent folder, the flag having a value indicating that the folder below the parent folder is in scope.

12. The method of claim 1 wherein the hierarchically-organized system is a file system.

13. In a hierarchically-organized system of documents and folders, a mechanism for responding to a query with at least one document that matches a specified scope from among one or more documents which have been retrieved based on specified criteria, comprising:

means for selecting a retrieved document as a current document;

means for obtaining an identifier of the current document;

means for obtaining an identifier of a parent folder of the current document;

means for accessing a data structure to determine scope information of the current document, the data structure including a flag indexed by the identifier of the parent folder wherein the flag has a value indicative of whether the current document is in scope; and means for returning information for the current document in response to the query when the value of the flag indicates the document is in scope.

14. The mechanism of claim 13 wherein the means for obtaining an identifier of the parent folder includes a document identifier to parent document identifier mapping table.

15. The mechanism of claim 13 wherein the data structure comprises a hash table.

16. The mechanism of claim 13 wherein the hierarchically-organized system is a file system.

17. The mechanism of claim 13 further comprising means for selecting another retrieved document as a second current document, means for obtaining an identifier of the second current document, means for obtaining an identifier of a second parent folder of the second current document, means for accessing a data structure with the identifier of the second parent folder as an index thereto, means for receiving a value from the data structure indicating that the identifier of the second parent folder does not correspond to an entry in the data structure, means for comparing the second parent folder with the specified scope, and means for adding an entry to the data structure indexed by the identifier of the second parent folder, the entry including a value indicative of whether the second parent folder corresponds to the specified scope.

18. The mechanism of claim 17 wherein the means for comparing the second parent folder with the specified scope includes means for obtaining an identifier of a third folder which is hierarchically above the second parent folder, and means for accessing the data structure with the identifier of the third parent folder as an index thereto.

19. The mechanism of claim 13 wherein the parent folder of the current document is the immediate parent folder.

20. The mechanism of claim 13 wherein the flag indicates that the document is not in scope, and further comprising means for obtaining an identifier of a folder hierarchically below the parent folder, and means for entering at least one additional flag into the data structure indexed by the identifier of the folder below the parent folder, the flag having a value indicating that the folder below the parent folder is not in scope.

21. In a query engine, a mechanism for responding to a query, comprising:
    a criteria matching component for retrieving one or more documents in response to a user specified restriction; and
    a scope testing component for selecting each of the retrieved documents in response to a user specified scope, the scope testing component including means for obtaining an identifier of a selected one of the documents, means for accessing a table indexed by the identifier of the current document to obtain an identifier of a parent folder above the current document, means for accessing a data structure indexed by the identifier of the parent folder, the data structure including a flag indicative of the scope of documents stored below the parent folder, and means for returning information for the current document in response to the query when the flag equals a predetermined value.

22. In a query engine having a criteria matching component for retrieving documents in response to a user specified restriction, a method of determining the scope of at least one of the plurality of documents in response to a scope specification, the method comprising the steps of:
    selecting a retrieved document as a current document, obtaining an identifier of the current document, obtaining an identifier of a parent folder of the current document, accessing a data structure using the identifier of the parent folder as an index, the data structure including flags indexed by the identifiers of parent folders;
    receiving a response from the data structure, the response comprising a flag having a value indicative of the whether the current document is in scope, or an indication that the parent folder was not indexed in the data structure; and
    when the flag is received, determining if the value indicates that the document is in scope, and if in scope, returning information for the current document in response to the query; and
    when the indication that the parent folder was not indexed is received, comparing the parent folder against the scope specification to determine the scope of the current document, storing in the data structure a flag indexed by the parent folder, the flag having a value indicative of the whether the current document is in scope, and if in scope, returning information for the current document in response to the query.

23. The method of claim 22 wherein the step of obtaining an identifier of a parent folder of the current document includes the step of accessing a document to parent mapping table.

24. In a hierarchically-organized system of documents and folders, a method of responding to a query with at least one document that matches a specified scope from among one or more documents which have been retrieved based on specified criteria, the method comprising the steps of:
    selecting a retrieved document as a current document;
    obtaining an identifier of the current document;
    obtaining an identifier of a parent folder of the current document;
    accessing a data structure, the data structure including a flag indexed by the identifier of the parent folder wherein the flag has a value indicative of the whether the current document is in scope;
    returning information for the current document in response to the query when the value of the flag equals a predetermined value;
    selecting another retrieved document as a second current document;
    obtaining an identifier of the second current document;
    obtaining an identifier of a second parent folder of the second current document;
    accessing the data structure with the identifier of the second parent folder as an index thereto;
    receiving a value from the data structure indicating that the identifier of the second parent folder does not correspond to an entry in the data structure;
    comparing the second parent folder with the specified scope; and
    adding an entry to the data structure indexed by the identifier of the second parent folder, the entry including a value indicative of whether the second parent folder corresponds to the specified scope.

25. The method of claim 24 wherein the step of comparing the second parent folder with the specified scope includes the steps of obtaining an identifier of a third folder which is hierarchically above the second parent folder, and accessing the data structure with the identifier of the third parent folder as an index thereto.

26. The method of claim 24 wherein the entered value indexed by the identifier of the second parent folder is equal to the predetermined value when the second parent folder corresponds to the specified scope.

27. In a hierarchically-organized system of documents and folders, a method of responding to a query with at least one document that matches a specified scope from among one or more documents which have been retrieved based on specified criteria, wherein the query specifies at least one folder, the method comprising the steps of:
    selecting a retrieved document as a current document;
    obtaining an identifier of the current document;
    obtaining an identifier of a parent folder of the current document;
    accessing a data structure, the data structure including a flag indexed by the identifier of the parent folder wherein the flag has a value indicative of the whether the current document is in scope;
    returning information for the current document in response to the query when the value of the flag equals a predetermined value; and
    priming the data structure with a flag indexed by an identifier of the at least one folder specified in the query, the flag having a value indicating that the at least one folder is in scope.

28. In a hierarchically-organized system of documents and folders, a method of responding to a query with at least one document that matches a specified scope from among one or more documents which have been retrieved based on specified criteria, the method comprising the steps of:

selecting a retrieved document as a current document;

obtaining an identifier of the current document;

obtaining an identifier of a parent folder of the current document;

accessing a data structure, the data structure including a flag indexed by the identifier of the parent folder wherein the flag has a value indicative of the whether the current document is in scope;

returning information for the current document in response to the query when the value of the flag equals a predetermined value indicating that the document is in scope;

obtaining an identifier of a folder hierarchically below the parent folder; and entering at least one additional flag into the data structure indexed by the identifier of the folder below the parent folder, the flag having a value indicating that the folder below the parent folder is in scope.

29. In a hierarchically-organized system of documents and folders, a mechanism for responding to a query with at least one document that matches a specified scope from among one or more documents which have been retrieved based on specified criteria, comprising:

means for selecting a retrieved document as a current document;

means for obtaining an identifier of the current document;

means for obtaining an identifier of a parent folder of the current document;

means for accessing a data structure, the data structure including a flag indexed by the identifier of the parent folder wherein the flag has a value indicative of whether the current document is in scope; and means for returning information for the current document in response to the query when the value of the flag indicates the document is in scope;

means for selecting another retrieved document as a second current document, means for obtaining an identifier of the second current document;

means for obtaining an identifier of a second parent folder of the second current document;

means for accessing a data structure with the identifier of the second parent folder as an index thereto;

means for receiving a value from the data structure indicating that the identifier of the second parent folder does not correspond to an entry in the data structure;

means for comparing the second parent folder with the specified scope; and means for adding an entry to the data structure indexed by the identifier of the second parent folder, the entry including a value indicative of whether the second parent folder corresponds to the specified scope.

30. The mechanism of claim 29 wherein the means for comparing the second parent folder with the specified scope includes means for obtaining an identifier of a third folder which is hierarchically above the second parent folder, and means for accessing the data structure with the identifier of the third parent folder as an index thereto.

31. In a hierarchically-organized system of documents and folders, a mechanism for responding to a query with at least one document that matches a specified scope from among one or more documents which have been retrieved based on specified criteria, comprising, means for selecting a retrieved document as a current document, means for obtaining an identifier of the current document, means for obtaining an identifier of a parent folder of the current document, and means for accessing a data structure, the data structure including a flag indexed by the identifier of the parent folder wherein the flag has a value indicative of whether the current document is in scope;

means for returning information for the current document in response to the query when the value of the flag indicates the document is in scope; and when the value of the flag indicates the document is not in scope, means for obtaining an identifier of a folder hierarchically below the parent folder, and means for entering at least one additional flag into the data structure indexed by the identifier of the folder below the parent folder, the flag having a value indicating that the folder below the parent folder is not in scope.

\* \* \* \* \*